(12) United States Patent
Mellor et al.

(10) Patent No.: US 8,724,851 B2
(45) Date of Patent: May 13, 2014

(54) AERIAL SURVEY VIDEO PROCESSING

(75) Inventors: Matthew Paul Mellor, Cumbria (GB); Simil Simon, Cumbria (GB)

(73) Assignee: HIDEF Aerial Surveying Limited (GB)

( * ) Notice: Subject to any disclaimer, the term of this patent is extended or adjusted under 35 U.S.C. 154(b) by 132 days.

(21) Appl. No.: 13/411,247

(22) Filed: Mar. 2, 2012

(65) Prior Publication Data

US 2013/0094700 A1  Apr. 18, 2013

(30) Foreign Application Priority Data

Oct. 12, 2011  (GB) .................................. 1117668.2

(51) Int. Cl.
G06K 9/00 (2006.01)

(52) U.S. Cl.
USPC ........................................................ 382/103

(58) Field of Classification Search
USPC ........................................................ 382/103
See application file for complete search history.

(56) References Cited

U.S. PATENT DOCUMENTS

| | | | | |
|---|---|---|---|---|
| 8,116,527 B2 * | 2/2012 | Sabol et al. | ................... | 382/103 |
| 8,363,109 B2 * | 1/2013 | Dunkel et al. | ................. | 348/169 |
| 2011/0052002 A1 | 3/2011 | Cobb et al. | | |
| 2011/0090337 A1 * | 4/2011 | Klomp et al. | ................. | 348/144 |
| 2012/0307065 A1 * | 12/2012 | Mimeault et al. | ............. | 348/149 |

FOREIGN PATENT DOCUMENTS

| | | |
|---|---|---|
| EP | 1879149 A1 | 1/2008 |
| WO | 2006082192 A1 | 8/2006 |

OTHER PUBLICATIONS

Brown, et al., Feature-Aided Multiple Target Tracking in the Image Plane, Proc. of SPIE, 2006, vol. 6229, pp. 62290Q-1-62290Q-12.

Freund, et al., A Decision-Theoretic Generalization of On-Line Learning and an Application to Boosting, Journal of Computer and System Sciences, 1997, 55:119-139.

Freund, et al., A Short Introduction to Boosting, Journal of Japanese Society for Artificial Intelligence, 1999, 14 (5):771-780.

Mellor, et al., Full Scale Trial of High Definition Video Survey for Offshore Windfarm Sites, Copyright Cowrie Ltd, Jun. 2008, 25 pages.

Intellectual Property Office, Search Report, GB 1117668.2, Feb. 2, 2012, 1 page.

PCT International Search Report, PCT/GB2012/052535, Feb. 22, 2013, 3 pages.

* cited by examiner

*Primary Examiner* — Tom Y Lu

(74) *Attorney, Agent, or Firm* — Quarles & Brady LLP

(57) ABSTRACT

An aerial survey video processing apparatus for analyzing aerial survey video. The apparatus includes a feature tracking section adapted to associate identified features with items in a list of features being tracked, based on a predicted location of the features being tracked. The tracking section updates the list of features being tracked with the location of the associated identified features.

21 Claims, 3 Drawing Sheets

AERIAL SURVEY VIDEO PROCESSING

BACKGROUND OF THE INVENTION

1. Field of the Invention

The present invention relates to a video processing apparatus and method adapted to analyse aerial survey video. The invention is applicable, for example, but not exclusively, in the field of offshore environmental surveying.

2. Description of the Related Art

In the field of offshore environmental surveying, it is often necessary to carry out surveys of large areas of open sea in a short period of time. The only feasible way to achieve this is to use an aircraft to deploy some means of implementing an environmental survey. In the past, such surveys have often utilised specially trained human observers, who identify and count observed creatures, such as sea birds and marine mammals. More recently these techniques have been replaced by technologies based on digital image capture.

Digital imaging survey technologies have many intrinsic advantages over visual observers: the surveys are repeatable and auditable; the aircraft can fly higher, increasing safety and enabling surveys over man-made constructions such as windfarms. However, one problem is that much of the captured digital images, such as video data, are views of empty sea not containing any items of interest. This makes analysis of the images to produce an offshore environmental survey very time-consuming and inefficient.

SUMMARY OF THE INVENTION

One aspect of the present invention provides an aerial survey video processing apparatus, adapted to analyse aerial survey video, comprising:

an input section for receiving the video to be analysed as a sequence of frames;

memory for storing a list of features being tracked in the video, and memory for storing a list of objects of interest in the video;

a motion tracking section adapted to calculate the relative motion between the field of view of a previous frame and the field of view of a current frame;

a location prediction section adapted to predict the location in the current frame of each item in the list of features being tracked, based on the location in the previous frame and the relative motion calculated by the motion tracking section;

a feature detection section adapted to identify features in the current frame;

a feature tracking section adapted to: associate identified features with items in the list of features being tracked, based on the predicted location of the features being tracked; update the list of features being tracked with the location of the associated identified features in the current frame; remove from the list of features being tracked items that are not associated with a feature identified in the current frame; add to the list of features being tracked features identified in a region of the current frame that was not in the field of view of the previous frame; and add to the list of objects of interest information on features being tracked whose predicted location is off the current frame and whose tracked motion is judged to have traversed the field of view; and an output section for outputting data on the resulting list of objects of interest.

Another aspect of the present invention provides an aerial survey video processing method for analysing aerial survey video, comprising:

receiving the video to be analysed as a sequence of frames;

calculating the relative motion between the field of view of a previous frame and the field of view of a current frame;

predicting the location in the current frame of each item in a list of features being tracked, based on the location in the previous frame and the calculated relative motion;

identifying features in the current frame;

associating identified features with items in the list of features being tracked, based on the predicted location of the features being tracked; updating the list of features being tracked with the location of the associated identified features in the current frame; removing from the list of features being tracked items that are not associated with a feature identified in the current frame; adding to the list of features being tracked features identified in a region of the current frame that was not in the field of view of the previous frame; and adding to a list of objects of interest information on features being tracked whose predicted location is off the current frame and whose tracked motion is judged to have traversed the field of view; and outputting data on the resulting list of objects of interest.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

A preferred embodiment of the invention comprises an aerial survey apparatus consisting of one or more digital video cameras mounted in an aircraft (not shown) and a review system (apparatus) consisting of one or more computers capable of reading in and processing the digital video survey files. The aerial survey is conducted by the camera capturing digital video while the aircraft is flown over the region being surveyed. After the digital video file is read in, the review system performs processing to determine whether there is an object of interest in each frame. The review system then provides an output, either a playlist or an edited video file, which can be reviewed by a human in place of the full video file, thereby saving human time and effort.

Review System

The review system of the preferred embodiment applies a two-stage process to determine whether or not each frame contains an object of interest. In the first stage potential objects of interest are detected and tracked through the video to produce a list of potential objects. Objects which do not persist all the way through the field of view are assumed to be waves and are rejected. In the optional second stage, feature classification, a description of each tracked object is compared against a training set containing both objects of interest and typical wave patterns to determine whether or not the object should be shown to a human reviewer. Once this processing has been completed for all frames in a video, an output is created which enables a human reviewer to playback just those frames judged by the review system to potentially contain an object of interest.

Figure 1:
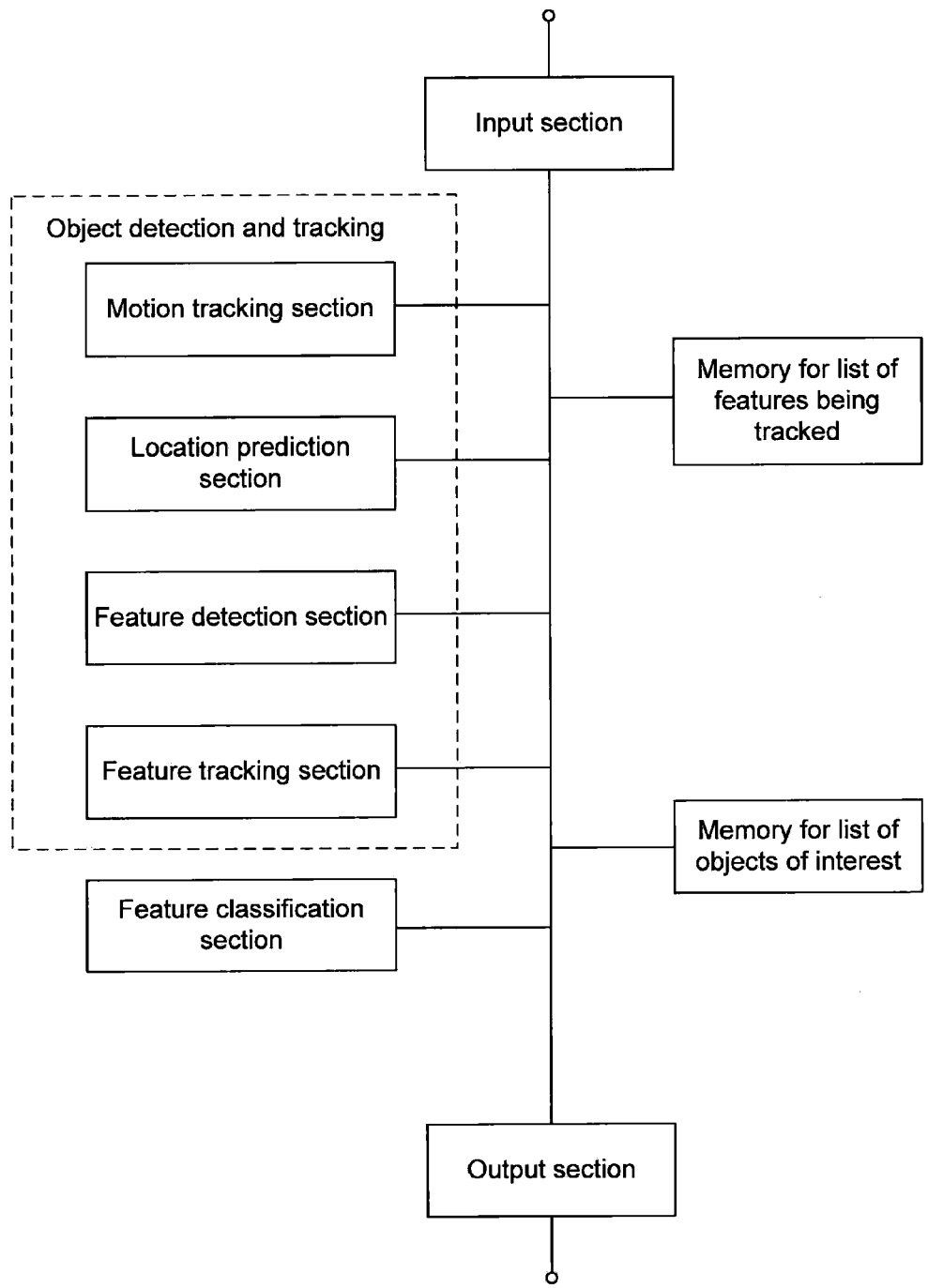
FIG. 1 is a schematic illustration of a video processing apparatus embodying the present invention.

FIG. 1 shows schematically an embodiment of the review system comprising input and output sections, a motion tracking section, a location prediction section, a feature detection section, a feature tracking section, a feature classification section, as well as memory for a list of features being tracked, and memory for a list of objects of interest. The operation of the various sections is described below.

It is possible to implement each of the various items in FIG. 1 as dedicated hard-wired electronic circuits; however the various items do not have to be separate from each other, and could all be integrated onto a single electronic chip. Furthermore, the items can be embodied as a combination of hardware and software, and the software can be executed by any suitable general-purpose microprocessor, such that in one embodiment the review system apparatus can be a conventional personal computer (PC), such as a standard desktop or laptop computer with an attached monitor, or can be a dedicated device.

The invention can also be embodied as a computer program stored on any suitable computer-readable storage medium, such as a solid-state computer memory, a hard drive, or a removable disc-shaped medium in which information is stored magnetically, optically or magneto-optically. The computer program comprises computer-executable code that when executed on a computer system causes the computer system to perform a method embodying the invention.

Object Detection and Tracking

Figure 2:
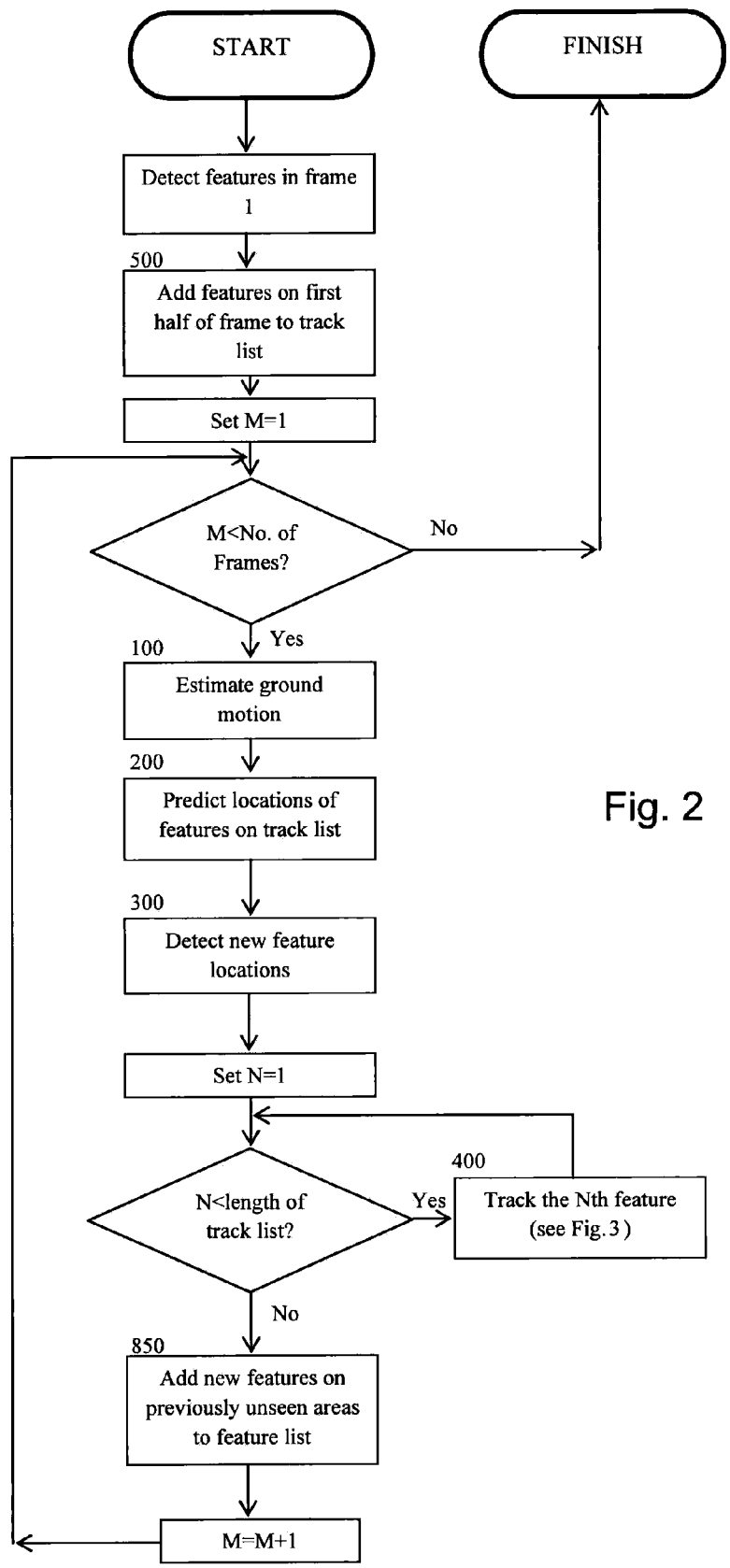
FIG. 2 is a flowchart of a method according to the review system part of present invention.
Figure 3:
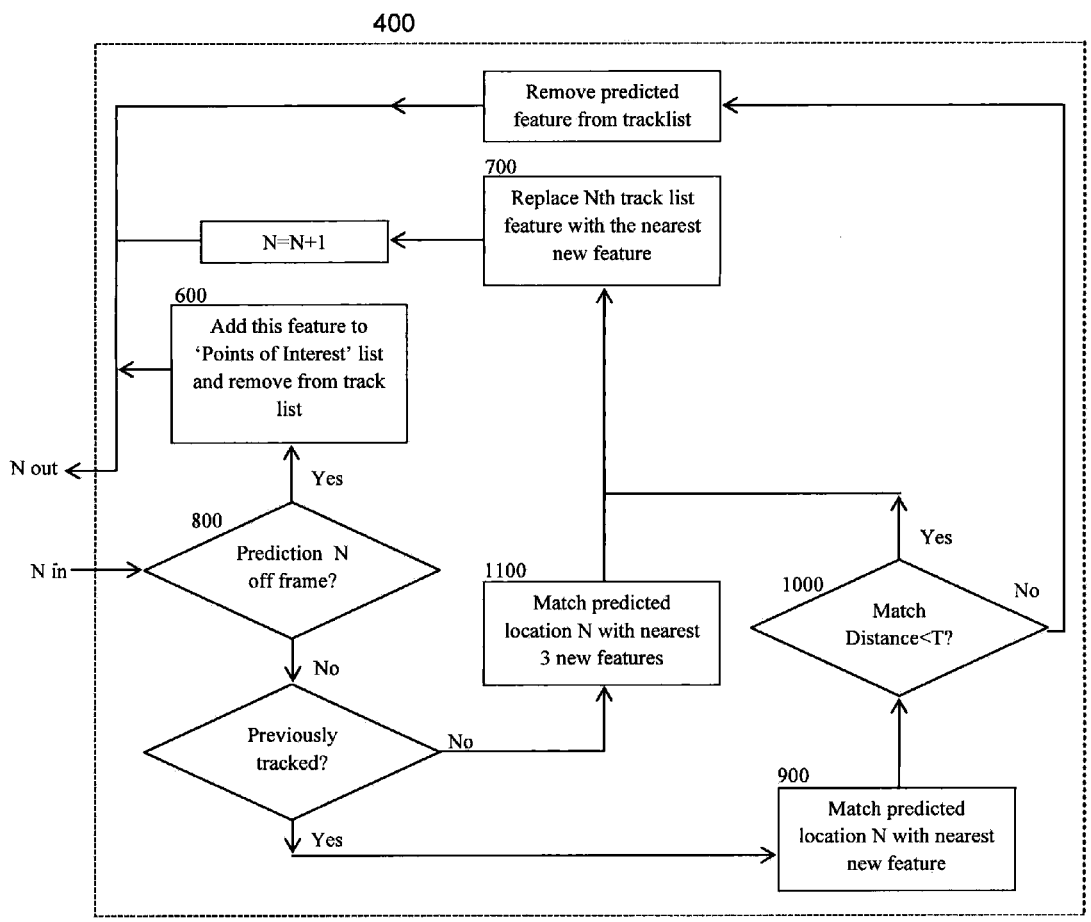
FIG. 3 is a flowchart of the feature tracking stage of the method of FIG. 2.

Referring to FIGS. 2 and 3, the first stage of the review system process, object detection and tracking, comprises four processes that are applied to each frame sequentially. These are: ground motion tracking [100]; feature position prediction [200]; feature detection [300]; and feature tracking [400]. The procedure is as follows:

Firstly, initialization is performed. Feature points that are candidate objects of interest are detected (feature detection is described below). To simplify statistical analysis, objects are only considered to be of interest if they pass an arbitrary boundary defined in the image, usually the midline. At step [500] any feature in the first frame that is behind the midline might cross the midline in a later frame and may be an object of interest; therefore all features behind the midline make up the initial list of features to be tracked. An empty list of objects of interest is created.

The rest of the procedure is applied for each frame in succession, starting with the second frame. At step [100] a motion tracking function (described below) is used to define the motion vector between this frame and the previous frame. At step [200] predicted feature locations are generated from previous feature locations and the ground motion vector by a feature motion prediction function (described below).

The feature detector is then applied to the image at step [300]. The resulting list of features is split into two groups. (i) The features located in the part of the frame that overlaps with the field of view of the previous frame are processed by a feature tracking method (described below) which associates predicted features with observed features. Where a predicted feature is successfully associated with an observed feature, the prediction is replaced with the observation and the feature is retained on the track list. Predicted features that cannot be associated with an observed feature and observed features that cannot be associated with a predicted feature are both discarded. (ii) The features found in the area of image that has appeared for the first time in this frame are added to the track list.

Any predicted locations that are off the field of the image (detected at step 800) correspond to objects that have traversed the field of view. If these objects have passed the midline of the image (the midline being perpendicular to the direction of motion of the camera), they are considered to have successfully traversed the image and are added to the list objects of interest and are removed from the list of features to be tracked (step 600).

Motion Tracking:

The motion is defined by a transformation that maps a point in the previous image to a point in the current image. This is a common task in many computer vision applications, where it is often referred to as image registration or image alignment, and there are many ways to achieve it. The majority of these methods could be applied successfully in the review system, because this is a relatively easy motion tracking task. The simplest motion tracking method that can be used is cross-correlation combined with a bandpass pre-filter. The bandpass reduces high frequencies (noise) and very low frequencies (camera artefacts) and emphasises image features. Cross-correlation itself is a process in which every possible translation is evaluated using a similarity score comprising the sum of the multiple of the pixels of the current image with the pixels of the previous image. The best translation is the one that maximises this score.

Motion tracking could be further enhanced in two ways: the complexity of the transformation model can be increased to allow rotations, affine transforms, perspective transforms, non-rigid transforms (e.g. splines), or fluid transforms; and the similarity measure can be altered to improve robustness to some particular data by replacing cross-correlation with: total variation, sum of squared differences, normalised cross correlation, mutual information and or any other of the many image similarity measures that are known in the literature.

Feature Detection:

The feature detection process finds points in the image which are centered on potential objects of interest. Because the feature detection process has to be applied to every image pixel, it needs to be an operation of relatively low computational cost. However, very simple operators tend to be less specific and therefore generate more false detections. The feature detector has to strike a balance between complexity and specificity. Potentially many feature detectors could be used to achieve this: a good choice for birds is a 'blob detector' based on the second derivative structure of the image, as described by the equation below.

$$B = |I_{xx} + I_{yy}| - \sqrt{I_{xy}^2 + \left(\frac{I_{xx} - I_{yy}}{2}\right)^2}$$

Where: B is the 'blob score'; $I_{xx}$ is the second derivative of the image with respect to the x direction; $I_{yy}$ is the second derivative with respect to the y direction; and $I_{xy}$ is the second derivative (differentiating once with respect the x direction and once with respect to the y direction). The first part of the score (i.e. the bit outside the square root) is the modulus of the laplacian of the image which responds to locally symmetric image features such as blobs; however, it also responds to linear features such as edges and lines, which are often thrown up by waves. The second part of the expression (the square root and its contents) responds to linear features only; by subtracting this from the laplacian, the score is corrected so that it only responds to blobs.

Preferably, the image is pre-processed to minimise image variations caused by the camera or the lighting conditions. A good way to do this is to use a local mean subtraction to remove image brightness effects, followed by dividing by the local standard deviation to remove variations in contrast.

The score can be improved by evaluating it at a plurality of scales. This is achieved by convolving the image with each of a range of Gaussian filters, calculating B for the resulting image and then computing the maximum of B for each pixel. Preferably, four scales are used, each twice as big as the previous scale. When working with 2 cm resolution imagery, for example, Gaussians with standard deviations of 2, 4, 8 and 16 pixels work well.

Once the score has been calculated at every pixel, features points are identified by locating local maxima in the score, above a threshold value. Thresholds in the range 5-50 are preferable for images normalised using the pre-processing scheme described above and with resolutions between 1 cm and 3 cm.

The output of the process is a list of coordinates of feature points. Preferably, each feature point is also accompanied by the local scale (i.e. the scale of the Gaussian that generated the maximum blob score at that point in the image), and a binary feature classifying each feature as either light or dark, according to the local sign of the laplacian.

Feature Prediction:

The feature prediction function generates an anticipated location for a feature observed in the previous frame in the current frame. The predicted location is calculated by adding the frame motion to the previous feature location. If the feature has a defined velocity, the prediction is further refined by adding the velocity on to the predicted feature location.

Feature Tracking:

The purpose of the feature tracking process is to associate previously observed features with new features. Associating features means that the features are matched such that it is considered that the features correspond to the same object viewed in different frames. Each previously observed feature has a predicted location in the new image provided by the feature prediction method. The feature tracking method splits the predicted features into 'untracked features', i.e. those observed for the first time in the last image and 'tracked features' i.e. those that have been tracked across at least two frames. These two classes of features are treated differently, because no velocity information is yet available for the new features.

For the tracked features, the predicted feature will include velocity compensation and can be expected to be accurate. The process proceeds to step [900] where the tracked feature is associated with the nearest feature in the present image. At step [1000] the predicted feature is rejected if the nearest feature is further away than some threshold distance T. Ten pixels is a suitable threshold distance for 2 cm resolution imagery. The prediction error is added on to the velocity estimate for this feature.

For the untracked features, the prediction may not be accurate if the feature is a flying bird, because its velocity is unknown. In this case, at step [1100], three versions of the feature are created, and matched with the three nearest features. In each case the velocity estimate for that feature becomes the displacement between the predicted feature position and the position of the feature to which it has been matched. Preferably, feature matching is restricted by feature type; light blobs are not matched with dark blobs or vice versa.

Preferably, feature matching is restricted by scale; a feature of a particular scale can only be matched with a feature at the same scale or the next scale up or down.

At the end of the matching process, all predicted features that have not been matched to a new feature are deleted and are not carried forward.

Feature Classification

The output of the object detection and tracking phase of the process is a list of objects of interest. Each object of interest consists of a list of coordinates and frame numbers, which describe the position of the object in each of the frames it appears in, and a velocity estimate. The feature classification process of the method sorts through each of the objects of interest to classify them into objects worth reviewing by a human and 'clutter' i.e. uninteresting background features. This process is optional. It can be omitted in desired circumstances, for example, for feature-sparse video.

The first stage in the classification process is to identify any moving objects by looking at the magnitude of the velocity vector; any objects with a velocity above some threshold are considered to be moving and therefore worthy of closer inspection by a human.

Classification of static objects is then performed based on a training set comprising labelled examples of both objects of interest and clutter. Typically, objects of interest are birds and marine mammals and clutter consists of waves and flotsam. This classification can be achieved using any suitable pattern recognition method. For example, the dimension of the data can be reduced by projection onto a bank of linear filters derived from the training data using a data reduction technique such as Principal Component Analysis (PCA) or Independent Component Analysis (ICA). Each object is represented by the response of the various filters in the filter bank; typically between 20 and 40 filters will provide sufficient descriptive power to distinguish birds from clutter. The vector of filter responses is then used to train a classifier based on any established classification method, such as K Nearest Neighbours, Support Vector Machines, Neural Networks, Decision Trees or Boosting. In particular the well known AdaBoost technique works particularly well when trained using Decision Trees as its weak classifier. The classification can, for example, remove from the list only items that are positively recognised as clutter, or can retain in the list only items that are positively recognised as being of interest (such as birds).

Producing the Playlist

The output of the classification stage is a reduced size set of objects of interest. Each of object of interest is known to exist on a number of frames. The union of all the frames occupied by all the objects of interest is the list of frames that should be reviewed by a human. Because short breaks in the footage can be disorientating to the reviewer, any gaps in the list of frames to be reviewed that are smaller than a certain threshold should be filled. An appropriate choice for this threshold is to set it equal to the number of frames on which a stationary object appears as it moves through the field of view. This number would typically between 4 and 20 depending on the camera parameters.

What is claimed is:

1. An aerial survey video processing apparatus, adapted to analyse aerial survey video, comprising:
   an input section for receiving the video to be analysed as a sequence of frames;
   memory for storing a list of features being tracked in the video, and memory for storing a list of objects of interest in the video;
   a motion tracking section adapted to calculate the relative motion between the field of view of a previous frame and the field of view of a current frame;
   a location prediction section adapted to predict the location in the current frame of each item in the list of features being tracked, based on the location in the previous frame and the relative motion calculated by the motion tracking section;
   a feature detection section adapted to identify features in the current frame;

a feature tracking section adapted to: associate identified features with items in the list of features being tracked, based on the predicted location of the features being tracked; update the list of features being tracked with the location of the associated identified features in the current frame; remove from the list of features being tracked items that are not associated with a feature identified in the current frame; add to the list of features being tracked features identified in a region of the current frame that was not in the field of view of the previous frame; and add to the list of objects of interest information on features being tracked whose predicted location is off the current frame and whose tracked motion is judged to have traversed the field of view; and an output section for outputting data on the resulting list of objects of interest.

2. The video processing apparatus according to claim 1, further comprising a feature classification section adapted to remove from the list of objects of interest those judged to be both stationary and not selected by a pattern recognition method as being of potential interest.

3. The video processing apparatus according to claim 1, wherein the feature tracking section is further configured to associate identified features with items in the list of features being tracked based on comparison of the appearance of the identified features with the features being tracked.

4. The video processing apparatus according to claim 1, wherein the feature tracking section calculates the velocity of each feature being tracked based on the change in location from the previous frame to the current frame, and based on the frame motion calculated by the motion tracking section, and stores the velocity information in the list of features being tracked together with information identifying the current frame and the location of the feature in the current frame.

5. The video processing apparatus according to claim 4, wherein the location prediction section further uses the velocity information of each item in the list of features being tracked to predict the location in the current frame of each item in the list of features being tracked.

6. The video processing apparatus according to claim 1, wherein the feature tracking section associates an identified feature with an item in the list of features being tracked when the difference in location between the identified feature and the predicted location of the feature being tracked is less than a first threshold value.

7. The video processing apparatus according to claim 1, wherein the feature detection section repeats the feature detection at a plurality of different scales.

8. The video processing apparatus according to claim 1, wherein the feature tracking section associates an identified feature with an item in the list of features being tracked when their difference in scale is less than a second threshold value.

9. The video processing apparatus according to claim 1, wherein the feature tracking section judges the tracked motion of a feature being tracked to have traversed the field of view if it has crossed a predetermined line in the field of view.

10. The video processing apparatus according to claim 1, wherein the output section outputs at least one of: a list of frames and an edited video sequence, wherein, relative to the input video, frames identified as not containing objects in the list of objects of interest have been removed from the output.

11. An aerial survey video processing method for analysing aerial survey video, comprising:

receiving the video to be analysed as a sequence of frames;
calculating the relative motion between the field of view of a previous frame and the field of view of a current frame;
predicting the location in the current frame of each item in a list of features being tracked, based on the location in the previous frame and the calculated relative motion;
identifying features in the current frame;
associating identified features with items in the list of features being tracked, based on the predicted location of the features being tracked; updating the list of features being tracked with the location of the associated identified features in the current frame; removing from the list of features being tracked items that are not associated with a feature identified in the current frame; adding to the list of features being tracked features identified in a region of the current frame that was not in the field of view of the previous frame; and adding to a list of objects of interest information on features being tracked whose predicted location is off the current frame and whose tracked motion is judged to have traversed the field of view; and
outputting data on the resulting list of objects of interest.

12. The video processing method according to claim 11, further comprising removing from the list of objects of interest those judged to be both stationary and not selected by a pattern recognition method as being of potential interest.

13. The video processing method according to claim 11, wherein the step of associating identified features with items in the list of features being tracked is further based on comparison of the appearance of the identified features with the features being tracked.

14. The video processing method according to claim 11, further comprising calculating the velocity of each feature being tracked based on the change in location from the previous frame to the current frame, and based on the calculated frame motion, and storing the velocity information in the list of features being tracked together with information identifying the current frame and the location of the feature in the current frame.

15. The video processing method according to claim 14, further comprising using the velocity information of each item in the list of features being tracked to predict the location in the current frame of each item in the list of features being tracked.

16. The video processing method according to claim 11, wherein an identified feature is associated with an item in the list of features being tracked when the difference in location between the identified feature and the predicted location of the feature being tracked is less than a first threshold value.

17. The video processing method according to claim 11, wherein for each frame, the feature identification is repeated at a plurality of different scales.

18. The video processing method according to claim 11, wherein an identified feature is associated with an item in the list of features being tracked when their difference in scale is less than a second threshold value.

19. The video processing method according to claim 11, wherein the tracked motion of a feature being tracked is judged to have traversed the field of view if it has crossed a predetermined line in the field of view.

20. The video processing method according to claim 11, wherein the output data comprises at least one of: a list of frames and an edited video sequence, wherein, relative to the input video, frames identified as not containing objects in the list of objects of interest have been removed from the output.

21. A non-transitory tangible computer readable medium storing a computer program comprising computer-executable code that when executed on a computer system causes the computer system to perform a method according to claim 11.

* * * * *